Oct. 22, 1968    R. E. BENHAM    3,407,337
LEAK DETECTOR FOR SWIMMING POOL LIGHTS AND THE LIKE
Filed Nov. 15, 1966    2 Sheets-Sheet 1
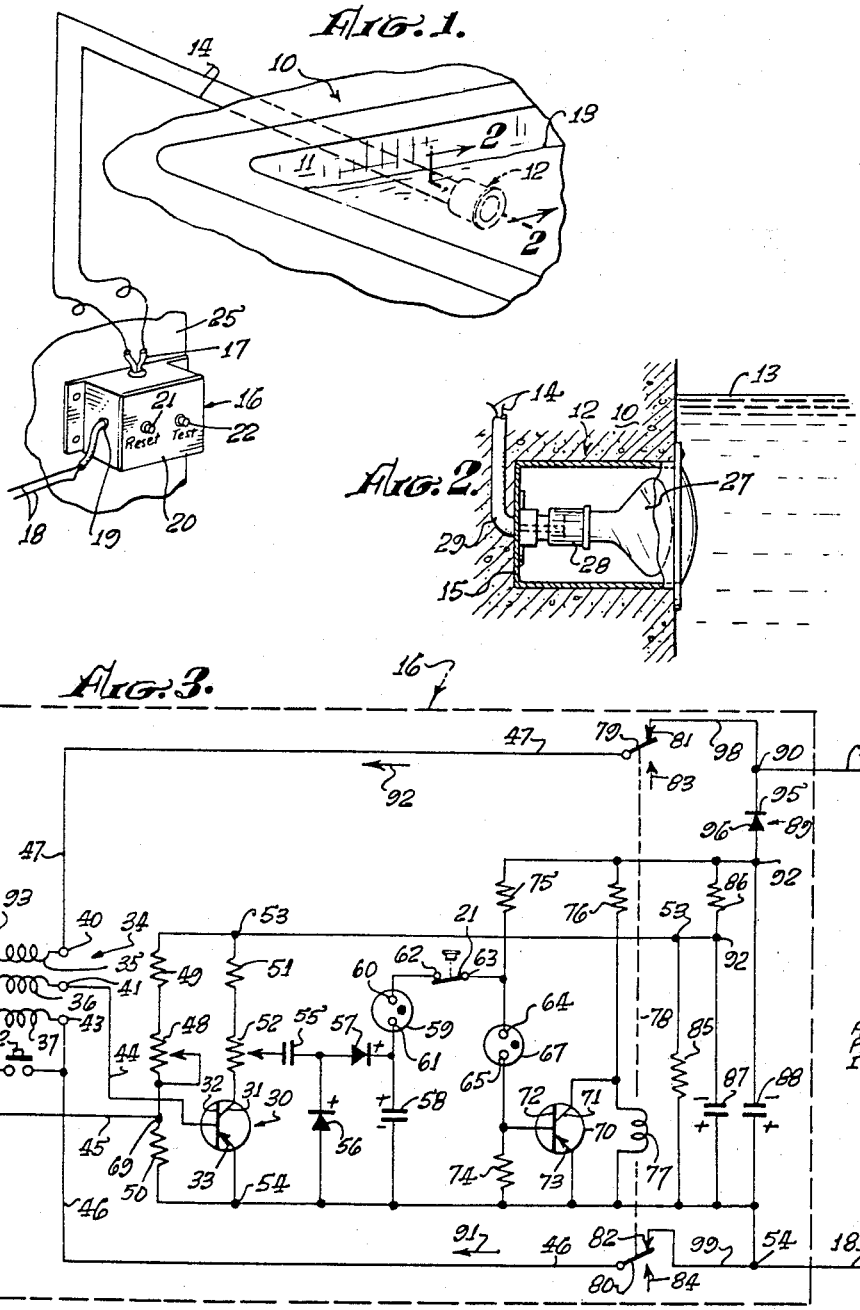
INVENTOR.
RALPH E. BENHAM,
By Boniard I. Brown
ATTORNEY.

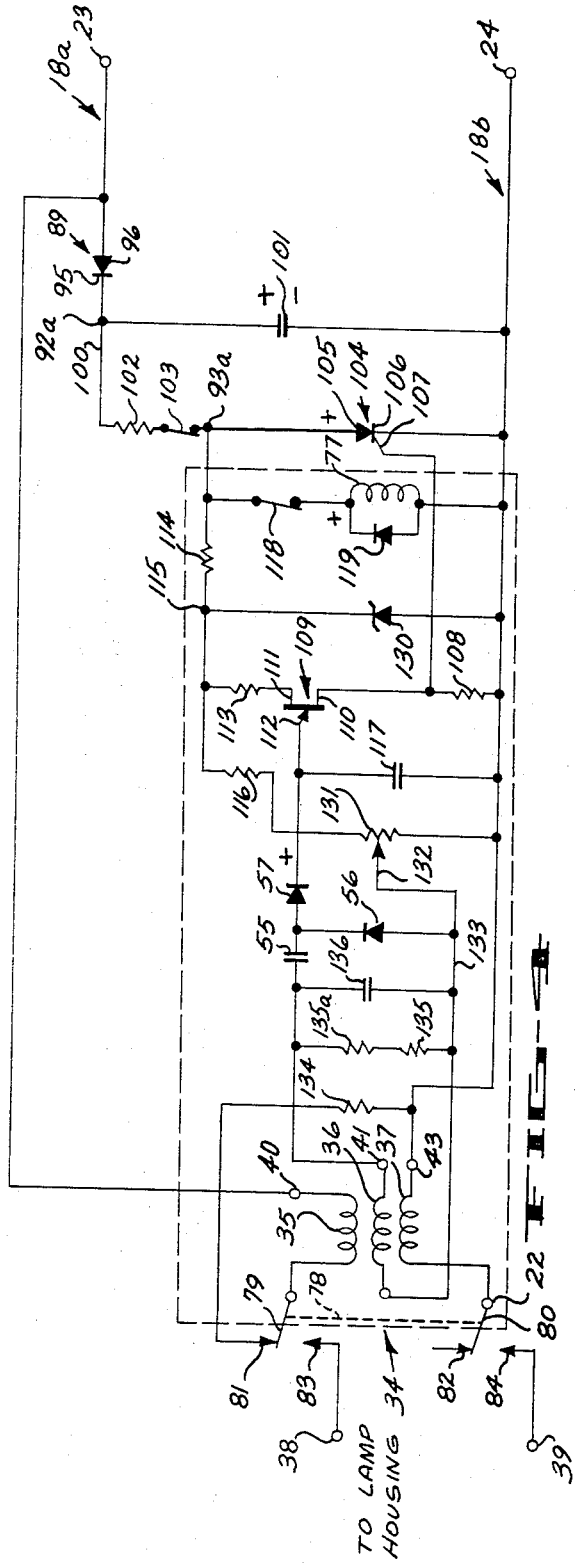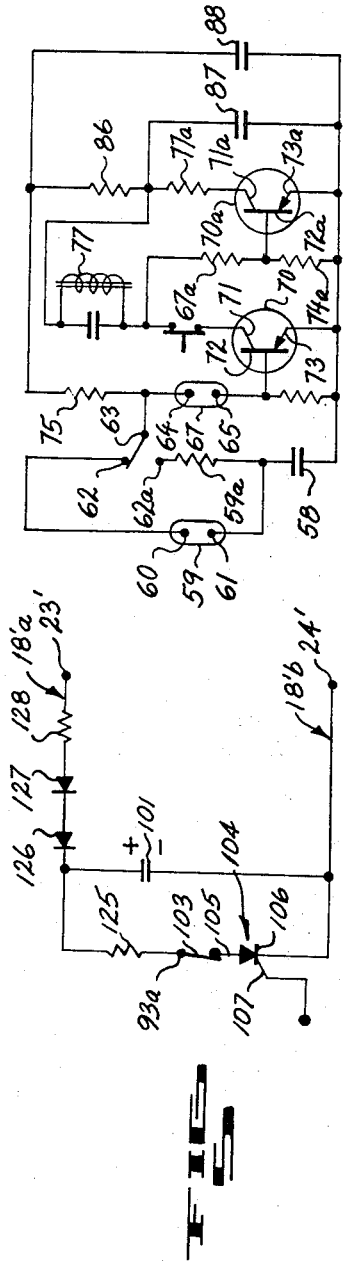

United States Patent Office 3,407,337
Patented Oct. 22, 1968

3,407,337
LEAK DETECTOR FOR SWIMMING POOL LIGHTS AND THE LIKE
Ralph E. Benham, Arcadia, Calif., assignor, by mesne assignments, to Purex Corporation, Ltd., Lakewood, Calif., a corporation of California
Continuation-in-part of application Ser. No. 478,182, Aug. 9, 1965. This application Nov. 15, 1966, Ser. No. 594,572
16 Claims. (Cl. 317—18)

ABSTRACT OF THE DISCLOSURE

A leak detection system is disclosed incorporating a differential transformer in an A.C. power line circuit through which the load circuit current flows, the current, when normal, producing no output in a sense winding of the differential transformer; any moisture or leakage condition producing an output in the sense winding due to the unbalance created thereby; and the sense winding output providing a triggering signal for a relay actuation circuit which disconnects the system from the A.C. power line for the duration of the leakage condition or until reset after the condition is corrected.

---

This application is a continuation-in-part of application Ser. No. 478,182 filed Aug. 9, 1965.

The present invention relates generally to protective circuits; more particularly, the invention relates to a protective circuit for swimming pool or similar sealed lighting fixtures disposed beneath the water line of a water-filled area to disconnect the circuit power if moisture from the water-filled area should enter a lighting fixture.

In modern swimming pools, illuminated fountains, or similar structures, the lighting thereof is generally from under water edges of the pools or fountains. The lighting fixtures which are used to provide the under water illumination are hermetically sealed into the sides of the water-enclosing area. Since these fixtures are connected to the electric power system, should the seal leak and the water enter the fixture enclosure, there is a great danger of shock to persons coming in contact with the water, or entering the pool. The extreme of this danger is electrocution of one in the water also coming in contact with a metal part of a pool fixture such as an exit ladder.

The present invention has been devised to obviate the danger above-described by providing means which will disconnect the electric power from the lamp in the lamp housing in the event that a leak should develop.

The new circuit interrupting system incorporates a differential transformer arrangement connected in series with each leg of the power lines to the lighting fixture. The windings of the differential transformer, which are respectively connected in the power line leads, are in phase opposition so that there will be no voltage developed in a sense winding disposed on the same core with the differential winding. Any shift in the circuit loading with respect to one of the power line windings will result in an unbalance between the currents in the respective differential windings and induce an A.C. voltage in the sense winding.

The sense winding in one embodiment of the system of the invention is connected to an amplifier from which the amplified signal is rectified and the resulting D.C. potential applied as a disconnect bias to a relay control circuit which is normally connected to the power source for the lights.

In another embodiment of the system of the invention the signal developed in the sense winding is rectified in a voltage multiplying rectifier circuit and applied to a unijunction transistor controlled rectifier device.

The positioning of the differential transformer with respect to the lighting fixture housing is such that any moisture entering the housing will result in a lowering of the impedance of the circuit out of one winding with respect to the other in the differential transformer, leading to the previously mentioned condition of unbalance.

A particular feature of the leak detector of this invention is its immunity to line voltage variations over a wide range. The lack of success of prior attempts to provide similar safety devices of the nature of the present invention has been due to their extreme sensitivity to power line voltage changes. Because of the voltage sensitivity a power line surge or dip would trigger their operation in the absence of a leak. Only current leakage due to the presence of moisture triggers the operation of the system of the present invention. When triggered, the system removes the power from the lamp circuit, holding it in an off condition until the leak can be repaired. The circuit is reset manually.

Accordingly, it is an object of the present invention to provide a moisture sensing circuit for hermetically-sealed lighting fixtures in a water environment which will disconnect the electric power from the lighting fixture upon the entry of moisture into the fixture.

It is another object of this invention to provide a leak detecting system for sealed lighting fixtures in a moist environment which will disconnect the fixture from the electric power source in the event of a leak in the fixture housing and which will be insensitive to line voltage changes in said power source.

It is another object of this invention to provide a moisture leakage detector for a sealed-in electric lamp housing in a moist environment incorporating a differential current transformed arranged in a phase-opposed circuit connection in series with the power outlet to the electric lamp circuit, and having a sensing winding which will develop a voltage proportional to the current leakage from the windings of the differential transformer in the presence of moisture leaking into the lamp housing, the sense voltage being used to actuate a relay circuit which disconnects the electric power from the lamp, the power remaining disconnected until the leak can be corrected and the circuit manually reset.

It is a further object of this invention to provide a reliable and inexpensive moisture leakage detector for swimming pool and electric fountain lighting circuits which removes the power from the circuit in the presence of moisture entering the lighting fixture housings.

Other objects, features and advantages of the present invention will become apparent to those versed in the art appertaining to this invention from a consideration of the following description, the appended claims and the accompanying drawings, wherein:

FIGURE 1 is a partially schematic illustration of a typical under water lighting fixture arrangement as it may be installed in a swimming pool incorporating the leakage detector system of this invention;

FIGURE 2 is a cross-section through 2—2 of FIGURE 1 showing another connecting arrangement for the invention and showing the lighting fixture interior with a lamp installed and the control circuit connected between the lamp and outlet therein;

FIGURE 3 is a circuit wiring diagram of a leak detector circuit according to this invention;

FIGURE 3a is a circuit diagram showing a modified embodiment of a portion of the circuit of FIGURE 3, wherein a direct coupled transistor arrangement is utilized;

FIGURE 4 is another schematic circuit diagram showing another embodiment of a leak detector according to the invention; and FIGURE 5 is a detail schematic drawing of circuit elements for connection of the system to higher level voltage sources.

As has been briefly described hereinabove, the invention consists of an electric circuit arrangement which may be connected in series with the power line leads to a sealed-in light fixture used in the side wall of a pool or fountain to cut off the electric power to the lamp in the lighting fixture in the event that moisture enters the sealed-in area.

In FIGURE 1 a general overall arrangement of the invention is shown as installed in a swimming pool, a corner of which is shown at 10. In a side wall 11 of pool 10 beneath the water line 13 a lamp housing 12 is installed. Electric wire leads 14 are shown in schematic form exiting from the rear 15 of housing 12 and being connected to a control unit 16 according to this invention, entering the control unit at 17. Power leads 18 from the A.C. power supply lines enter the control unit 16 at 19. On the exterior 26 of the control unit 16 a pair of push-buttons 21 and 22 are provided. Push button 21 as further described in detail below is a reset button to return the system to operation after either a test of the control unit or after it has been actuated by a leakage in housing 12, and following correction of the fault leading to the leak. Test push button 22 is used to simulate a leakage condition which will trigger the control unit and remove the power from the lamp in housing 12 as more fully described below.

An alternative embodiment of the invention may be seen in FIGURE 2, wherein a cross-section of lamp housing 12 a lamp 27 is shown installed in its electrode or contact assembly 28 with connecting leads 14 coupled to control unit 16 mounted in back wall 15 of housing 12. Power leads 18 are here brought to the housing in a waterproof jacketing as indicated at 29. The case 20 of control unit 16 would be sealed in an epoxy or other waterproof embedment when employed as shown in FIGURE 2.

The configuration of the control circuit (1b) of the invention is shown in FIGURE 3 to which reference is now made.

In the circuit of FIGURE 3 an amplifier transistor 30 is shown having a collector 31, a base 32 and an emitter 33. Collector 31 is connected through a potentiometer 52 and a resistor 51, connected in series, to a source of negative potential at 53. Base 32 of transistor 30 is connected via lead 44 to output terminal 41 of the sense winding 36 of a differential transformer 34. The return lead 45 of sense winding 36 is connected from terminal 42 of winding 36 to a junction 69 between a resistor 50 and a rheostat connected potentiometer 48. The remaining end of resistor 50 is connected to the return or positive leg 54 of the amplifier negative supply line 53. The remaining end of rheostat 48 is connected through a resistor 49 to amplifier negative supply line 53. Resistors 48, 49 and 50 form a voltage divider across the negative D.C. supply lines 53–54 to supply a bias potential for the base bias current in transistor 30, the value thereof being settable by the adjustment of rheostat 48.

Differential transformer 34 has in addition to sense winding 36 series current windings 35 and 37 which are so poled and positioned with respect to winding 36 that they induce phase cancelling signals in winding 36 so long as the loading of both windings 35 and 37 is the same. Any difference in loading of one or the other of windings 35 or 37 will create an unbalance in the out of phase signals being induced in winding 36 whereupon cancellation no longer occurs and an A.C. voltage is developed between terminals 41 and 42 to be applied to base 32 of transistor 30 and to be amplified therein.

A.C. power lead 46 is connected through normally closed relay contacts 79–81 further described below to input terminal 40 of transformer winding 35. The output terminal 93 thereof is connected to a terminal 38 which may go to one of the lamp leads 14 or to a terminal of a lamp electrode assembly such as 28. A.C. power lead 47 is connected through normally closed relay terminals 80–82 further described below to input terminal 43 of transformer winding 37. The output terminal 94 of winding 37 is connected to a terminal 39 which may go to the other of lamp leads 14 or to the other terminal of electrode assembly 28.

Test switch 22 may be connected as shown between terminals 43 and 94 so that transformer 34 becomes unbalanced during the closure of switch 22 to simulate a leakage condition. The emitter 33 of transistor 30 is connected to negative power return line 54.

Transistor 70 in FIGURE 3 also has a collector 71, a base 72 and an emitter 73. Transistor 70 is used as the control transistor and includes a collector load resistor 76 connected to a more negative potential point 92 than point 53. A relay coil 77 is connected from the collector 71 of transistor 70 to D.C. power return line 54. The base 72 of transistor 70 has a resistor 74 connected therefrom to D.C. power return line 54. A terminal 65 of a neon or other gas filled diode device 67 is also connected to base 72. The other terminal 64 of gas filled device 67 is connected through a resistor 75 to negative D.C. power potential point 92. Resistors 75 and 74 form a voltage divider when gas filled device 67 is conductive to place an appropriate bias on base 72 of transistor 70 so as to make transistor 70 conductive. When device 67 is not conducting there is no bias on transistor 70 or, when the bias is not of the forward biasing polarity, transistor 70 will not be conducting. The normal condition of transistor 70 in the absence of a leakage signal is to be conductive thus shorting relay coil 77.

Contacts 79–81 and 80–82 are mechanically coupled with relay coil 77 as indicated by dashed line 78. So long as transistor 70 is conducting when power is applied otherwise to relay coil 77 it will not be energized and terminals 79–81 and 80–82 will be closed in their normal or de-energized condition to permit A.C. power applied to leads 18 to be applied also to terminals 40 and 43 of differential transformer 34. Thus a lamp such as 27 shown in FIGURE 2 and connected to leads 14 (FIGURE 3) will be energized through windings 35 and 37 of differential transformer 34.

Returning now to amplifier transistor 30, the first of the two resistors in a series making up the collector load of transistor 30 is a potentiometer 52. The variable arm 68 thereof is coupled through a capacitor 55 to a voltage doubling diode array 56 and 57. The array is poled so as to produce a D.C. output signal at the junction of the positive terminal of capacitor 58 and terminal 61 of a gas filled coupling device 59 which may be a neon lamp. This D.C. output signal will be positive at the abovementioned junction with respect to the return line 54 and will be developed in response to the amplified A.C. signal appearing at the collector 31 of amplifier transistor 30. This signal is rectified by the voltage doubling diode array 56–57 and charges the capacitor 58 connected at the output of the array in the polarity indicated, positive at the junction with diode 57 and negative at the return line 54. Capacitor 58 may be an electrolytic or a non-polarized type. In any event the charging thereof will occur in the polarity above indicated.

The second terminal 60 of gas-filled coupling device 59 is connected to one terminal 62 of reset push button switch 21 previously mentioned. The movable or arm terminal 63 of push button switch 21 is connected to the junction of terminal 64 of gas-filled coupling device 67 and resistor 75 previously mentioned.

D.C. power to supply the base and collector bias potentials for the transistors 30 and 70 and to energize relay coil 77 is derived from a diode rectifier 89 poled to provide a negative D.C. output. Cathode 95 of diode 89 is connected to one leg of A.C. line 18 at 90. The anode 96 of diode 89 is connected to negative D.C. power line 92, one end of a filter resistor 86, and a filter capacitor 88. Capacitor 88 is an electrolytic capacitor. The other end of filter resistor 86 is connected to one end of a resistor 85, an electrolytic capacitor 87 and the negative D.C. line 53 for transistor amplifier 30. Resistors 85 and 86 form a voltage divider network the junction 53 of which is the low voltage negative D.C. line providing bias potentials to amplifier 30.

The operation of the control circuit of FIGURE 3 may now be more fully understood to be as follows:

A.C. power is applied to the control circuit 16 from an external source to terminals 23–24 and along leads 18 to junction 90 on the "hot" side of the circuit and to the neutral or return line 54 thereof. By leads 98 and 99 connected to normally closed contacts 81–82 of a relay 77–78 and through arm contacts 79–80 of relay 77–78, the A.C. power is applied via leads 47–46 to input terminals 40–43 of a phase opposed pair of windings 35–37 in a differential transformer 34. The output terminals 93–94 of windings 35–37 are connected to leads 14 on terminals 38–39 which supply power to a lamp 27 connected to leads 14 and installed in a sealed-in housing 12 in the wall 11 of a swimming pool 10 below the water-line 13 thereof. Leads 14 are ordinarily of a waterproofed character but in the swimming pool environment could come in contact with water due to a leak in the housing 12 and by capacitive coupling across the leakage path provide an A.C. return circuit through the pool water leading to the danger of electric shock, or more severe consequences from the shock, to persons in the pool.

The power thus supplied to the swimming pool lighting circuit must therefore pass through coils 35–37 in transformer 34 which form a series path to the lamp 27. Coils 35–37 are identical in impedance and would, as has been defined previously, in phase opposition so that as long as the impedances are identical, and thus balanced condition of the line produces no field by which an A.C. current can be induced in winding 36 of transformer 34. However, any condition, affecting one side of the line or the other, by which a slight shift in its impedance occurs, such as might be due to moisture entering the lamp housing, will result in an imbalance sufficient to induce a difference current in the sense winding 36.

In the normal operation of the system, that is, in the absence of a leakage current, transistor 70 is maintained in a conductive state by a forward bias on the base 72 thereof derived from the junction between resistors 75 and 74 through gas-filled coupling device 67 which is "fired" and therefore conductive because the difference of potential across device 67 at turn on of the equipment exceeds its firing potential. In a neon lamp used for device 67 this would be in the vicinity of 65–75 volts. Conduction is maintained at about 67 volts. The neon lamp 67 because of its constant firing potential is thus a regulating device remaining at 67 volts even when line voltage is high. The values of resistors 74 and 75 therefore would be chosen to provide the necessary forward bias at the base 72 of transistor 70 when a drop of about 67 volts occurs across device 67. It should be noted that the voltage to operate device 67 to keep it energized is only 67 volts. Thus the line voltage may go quite low before the line voltage can effect the operation of the unit. Therefore the system is unsensitive to line voltage changes.

In view of the connection of relay coil 77 between collector 71 of transistor 70 and the return line 54 of the circuit, when transistor 70 is conductive it represents substantially a short circuit across coil 77 and so relay contacts 79–81 and 80–82 remain closed to continue to supply A.C. current through windings 35–37 of transformer 34 to lamp 27.

To test the operation of circuit 16 test switch 22 may be used or any other means by which a change in impedance in one leg of the transformer windings 35–37 can be achieved. Switch 22 is normally open. Closing it momentarily places a short across winding 37 of transformer 34 and the resulting unbalance permits the induction of an A.C. current in winding 36 from winding 35. This A.C. signal is applied to the base 32 of transistor 30, is amplified thereby and the amplified counterpart thereof appears across collector load resistance 51–52. Transistor amplifier 30 is conventional in its configuration. The forward base bias is obtained from voltage divider network resistors 48, 49 and 50. Adjustment of resistor 48 sets the bias at the proper operating point for the transistor being used. The amplified A.C. signal at collector 31 is applied across coupling capacitor 55 to the junction of the voltage doubling rectifier diodes 56 and 57. The resulting D.C. charges capacitor 58 to a value sufficient to "fire" gas filled coupling device 59, thus applying the positive D.C. potential from capacitor 58 across device 67 and resistor 74, extinguishing device 67 and thereby removing the forward bias from the base 72 of transistor 70 and causing transistor 70 to become non-conductive. This removes the short across relay coil 77. Coil 77 is now energized through resistor 76 from the D.C. potential on line 92 and contacts 79–81 and 80–82 are parted to open the circuit to lines 46 and 47 thereby removing the A.C. power from lamp 27. Device 59 remains conductive being supplied through resistor 75 and the conductivity of diodes 56 and 57 from the D.C. between points 92 and 54.

The circuit may be reset by opening the normally closed push-button 21 connecting gas devices 59 and 67 together. This breaks the continuity of the circuit comprising resistor 75, device 59 and diodes 56 and 57. Device 59 is extinguished, becoming an open circuit. In the meantime device 67 is fired and conductive bias is returned to base 72, so that when switch 21 returns to its closed position there is insufficient potential present across device 59 to fire it and it remains an open circuit until a new charging signal is applied to capacitor 58.

The above-described sequence which has been indicated as having been initiated by a momentary switch closure of test switch 22 will occur also when a leakage condition develops between one or the other of the leads 14 and unbalance transformer 34. Again an A.C. signal will be developed across winding 36 and be amplified in transistor 30 to be applied to rectifiers 56 and 57 to charge capacitor 58 and fire device 59 which extinguishes device 67, removes the conductive bias from transistor 70 and energizes relay 77 to open the A.C. power circuit to lamp 27.

It should be clear from the above description that the removal of power from the leads 46–47 not only disconnects power from lamp 27 but also from leads 14 so that the leakage condition causing the operation of the control device will not create a dangerous condition any longer. After the leak has been removed and/or corrected the circuit may be reset by the operation of switch 21 as previously described. Since D.C. power for control circuit 16 is derived from the uninterrupted portion of the A.C. line the control circuit remains operative even when the A.C. is removed from the lamps.

It should be clear also from the above description that the variation of line voltage will have no effect upon the circuit of control unit 16 because there will be no phase shift occurring differentially in the windings 35–37 of the differential transformer as a consequence of the amplitude changes there must be a phase shift or substantial impedance difference between the respective balanced halves of the differential transformer before any current will be induced in sense winding 36.

In FIGURE 3a, a modification of the circuit of FIGURE 3 is shown incorporating a direct coupled transistor arrangement in which a transistor 70a and its components 71a, 72a, 73a, 74a, 77a correspond generally to the same parts of transistor 70 without the "a." Transistor 70a is in parallel with the relay 77 in transistor 70's collector circuit. The transistor 70a keeps the voltage from exceeding the transistor breakdown potential when one of the transistors is turned off. When transistor 70 is non-conductive transistor 70a is conductive and resistor 77a is of the same resistance value as relay coil 77. Therefore the load on the power supply remains identical regardless of whether relay 77 is energized or deenergized and no undue variation in power supply occurs and no overvoltage condition occurs to present the danger of burnout of the transistors. Thus lower voltage (and therefore more economical) transistor devices can be used in transistors 70, 70a instead of a much higher cost single transistor to handle a higher voltage condition.

In the circuit diagram of FIGURE 4 another embodiment of the leak detector according to this invention is shown. This embodiment includes the same leak detector transformer previously described in the discussion of FIGURE 3 above, the same relay coil 77 with its associated contacts 79–84 actuated thereby, the same power line connections 18a, 18b, 23, 24, and the same power rectifier system 89, 95, 96 as before. But here diode 89 is reversed in polarity so as to provide a positive D.C. output on line 100 filtered by polarized capacitor 101. Diode 119 across relay coil 77 is poled to dissipate reverse voltage surges which occur when potential is removed from or applied to relay coil 77. A filter and dropping resistor 101 is connected between the cathode 95 (junction point 92a) of diode 89 and a junction point 93a. Between junction point 93a and the D.C. current return through A.C. line lead 18b is connected a silicon controlled rectifier (SCR)104 in series with a single-pole-single-throw, normally-closed switch 103. The anode 150 of SCR104 is connected to switch 103, the cathode 106 is connected to return lead 18b. Gate lead 107 of SCR104 is connected through a resistor 108 to return line 18b. Resistor 108 and gate lead 107 are both connected to one of the bases 110 of a unijunction transistor (UJT)109. The other base 111 of UJT109 is connected through a resistor 113 to a positive D.C. potential line at 115 connected through a dropping resistor 114 to rectifier output point 93a. A Zener rectifier 130 is connected across the D.C. potential output between line 115 and line 18b to regulate the voltage between lines 115 and 18a to a predetermined value.

UJT109 includes an emitter 112 which is connected to the cathode (indicated by + sign) of diode 57. A fixed resistor 116 is in series with a variable resistor 131 connected between positive D.C. potential line 115 and return line 18b. Resistor 131 is a potentiometer. A capacitor 117 is connected from emitter 112 to return line 18b. Capacitor 117 is filter circuit for UJT109 as further described below.

Sense winding 36 of differential transformer 34 has a resistor 135, connected thereacross. Resistor 135 is usually a fixed resistor. The value of resistor 135 must be selected at the time of manufacture of the device for a desired operating level of sensing by winding 36. This sets the leakage current value at which the tripping action of the device will occur.

In the normally closed condition of relay contacts 79, 83 and 80, 84 power along lines 18a and 18b is applied to the lamp housing via terminals 38, 39. The contacts 79, 81 and 80, 82 of relay 77 are operated to open the circuit to lamp housing. These are shown in FIGURE 3 as if the circuit has been opened. Resistor 134 is connected between contact 81 of relay 77 and the line side (terminal 43) of primary winding 37. Resistor 134 can be made adjustable also in the manner of resistor 135, 135a. The sensitivity of circuit of FIGURE 3 may be varied by the selection of the value of resistors 135. Capacitor 136 connected across resistor 135 acts as a surge cushion, so to speak, damping out line surges not a function of a leak condition, as when sudden on-off switching conditions occur. Such a situation may result from the operation of a neon sign in the same power circuit as that which supplies the leak detector and swimming pool lights.

Capacitor 55 couples any leakage current from one side (terminal 41) of sense winding 36 to a voltage doubling rectifier diode arrangement 56, 57 which as previously noted is poled for a positive D.C. output connected to emitter 112 of UJT109. The return side of winding 36 connects to D.C. return line 133 of the rectifier circuit 56, 57 and to variable arm 132 of potentiometer connected resistor 131 connected between resistor 116 and D.C. return line 18b. As arm 132 is varied on resistor 131 the proportion of the D.C. output of rectifier system 56, 57 can be adjusted as it appears across resistors 131 and 116 or between emitter 112 and D.C. potential line 115 on return line 18b. The adjustment of arm 132 sets the point at which the diode represented by emitter 112 and base 110 of UJT109 will trigger causing a voltage drop across resistor 108, thus applying a gate pulse to gate electrode 107 of SCR104. The values of resistors 116 and 131 forming a voltage divider across D.C. line 115 and return line 18b are such as to maintain UJT109 normally conductive when the charge on capacitor 117 due to the rectified leakage signal from diodes 57, 56 overcomes the bias on emitter 112; when capacitor 117 discharges the bias is removed.

An SCR such as 104 is a normally non-conductive diode which becomes conductive when a voltage pulse of suitable amplitude is applied to its gate electrode such as 107. SCR devices are like thyratrons of vacuum tube technology. In their operation, they act in an "all-or-none" fashion. That is, once triggered an SCR remains in operation (conducting) until the power source is removed or its polarity reversed.

Thus, when the voltage pulse across resistor 108 occurs in response to the leakage-initiated unbalance condition in differential transformer 34, previously described, a pulse is applied to gate 107 of normally non-conductive SCR104 rendering it conductive and shorting the line between points 93a and line 18b to which SCR104 is connected. As a result of the short circuit power is by-passed around relay coil 77 causing relay contacts 79, 81 and 80, 82 to assume the open circuit condition shown in FIGURE 3 thus removing the A.C. power from lamp housing circuits connected at 38 and 39.

In the normal operation of the system (in the absence of a leak condition), relay coil 77 is normally energized from D.C. rectifier supply point 93a.

As soon as SCR104 is gated to become conductive, as above described, the D.C. supply to relay 77, and also to UJT109, is shorted and, as above indicated, due to the once-triggered-it-remains-on characteristic of the SCR, this shorted condition continues until the power is either removed from the SCR diode or reversed so as to be polarized in opposite phase to the normal conduction direction of the SCR.

The removal of D.C. from SCR109 is accomplished by opening normally closed switch 103. (FIGURE 5 shows switch 103 in the closed position.)

When reset switch 103 is depressed, the relay is open and no power is applied to the lamp. When the switch button is released, the relay is activated and power is applied to the lamp. If a fault exists, the power is immediately turned off by the normal operation of the system. This eliminates the possibility of personal injury or shock during the reset process, and a safe reset action is provided.

Normally closed test switch 118, in series with relay coil 77, is provided for test purposes. When switch 118 is opened D.C. power is removed from relay coil 77 and relay contacts 79, and 80 go to their open circuit conditions. When test switch button 118 is depressed, any leakage due to lines to the lamp is removed, and a leak is simulated which is slightly greater than the trip level, by connecting resistor 134 into the circuit. If the circuit is operating properly, SCR109 is turned on, and the relay will not reclose when the test switch button 118 is released. If there is improper circuit operation, the relay will reclose when the switch button is released. If the system is functioning properly, reset button 103 must be depressed to energize the lamp. Thus, there is provided testing of all system functions.

If A.C. power applied goes low then relay coil 77 would not be energized, its contacts would then be in the open condition removing power from the swimming pool lamps.

The detail of the rectifier circuit shown in FIGURE 5 illustrates how the system may be employed where the power line source voltage is greater. Circuits are usually 117 v. A.C. But if the supply should happen to be 220 v. A.C., the circuit of FIGURE 5 will provide the same voltages to the SCR104 and UJT109 as would have been the case with a 117 v. supply. In the circuit resistor 128 in series with power line lead 18'a and a pair of diodes 127 and 126 connected in series provides an A.C. voltage drop to diodes 126 and 127 and resistor 125 is a resistor of the same character as resistor 120 in FIGURE 4 but may have a different value to provide an appropriate voltage drop to point 93a. Diodes 126, 127 may be replaced by a single diode if the characteristics thereof permit application of higher voltage thereto.

There has been described hereinabove embodiments of a leakage condition detector for swimming pool or other under water lighting fixtures which in the event of the leakage removes the power from the circuits in which the leak appears to prevent such circuits from becoming safety hazards to those using the pool.

Those versed in the are will appreciate that the present invention achieves the objects and realizes the advantages hereinbefore mentioned.

Although specific embodiments of the present invention have been illustrated and described herein, it will be understood that the same are merely exemplary of presently preferred embodiments capable of attaining the objects and advantages hereinbefore mentioned, and that that invention is not limited thereto; variations will be readily apparent to those versed in the art, and the invention is entitled to the broadest interpretation within the terms of the appended claims.

The inventor claims:

1. A leakage detecting circuit for detecting the change in conductivity in electric wiring of a lighting fixture in a swiming pool in the event of moisture leaking into the lighting fixture housing, said detecting circuit comprising: balanced transformer means connected in series with said electric wiring and adapted to retain the balance thereof irrespective of the amplitude of the electric power voltage being applied to said wiring and having sense circuit means coupled to said transformer means to detect the unbalance in said transformer means resulting from leakage current in the event of moisture entering said fixture, said sensing means including rectifier means connected to said balanced transformer means and said relay circuit is normally activated, is connected to said rectifier means and is adapted to be responsive to rectified sense signals developed by said rectifier means in response to signals resulting from said unbalance in said transformer means to become deactivated; and a relay circuit connected in series with the electric wiring to said balanced transformer means and said lighting fixture and adapted to maintain continuity in said electric wiring in the absence of a leakage current being detected by said sense circuit means, and adapted to open said electric wiring circuit to said transformer means and to said lighting fixture when said leakage current is detected by said sense circuit means.

2. A swimming pool lighting circuit leakage sensing and protective circuit comprising: means including a sense winding and detector circuit connected thereto for detecting the change in current in said lighting circuit due to a leak developing therein; a normally non-conductive transistor control circuit connected to said detector circuit for detecting the change in current due to a leak and adapted to become conductive in the event of said change in current; and relay circuit means having when energized normally closed contacts in series with said lighting circuit and an external electric supply thereto, and a relay coil in parallel with said transistor control circuit, said coil being short-circuited by said transistor control circuit when said transistor control circuit is conductive, said relay adapted to be energized when said transistor control circuit is non-conductive, whereby said change in current due to a leak induces a signal in said detector circuit by which said transistor control circuit is rendered conductive and said relay circuit is de-energized to disconnect said lighting circuit from said external electric supply.

3. A lighting circuit leakage sensing and protective circuit comprising:
means connected in the lighting circuit including a sense winding and a detector circuit connected thereto for detecting the change in current in said lighting circuit due to a leak developing therein;
a normally non-conductive silicon controlled rectifier control circuit connected to said detector circuit for detecting the change in current due to a leak and adapted to be responsive to said change in current to become conductive in the event of said change in current; and
relay circuit means having, when energized, normally closed contacts in series with said lighting circuit and an external electric supply thereto, and a relay coil in parallel with said silicon-controlled rectifier control circuit said coil being short-circuited when said control circuit is conductive, said relay adapted to be energized when said control circuit is non-conductive whereby said change in current due to a leak induces a signal in said detector circuit by which said control circuit is rendered conductive and said relay circuit is de-energized to disconnect said lighting circuit from said supply.

4. A leakage detecting circuit for hermetically sealed underwater swimming pool lighting fixtures and connected in series with the A.C. power connections to said lighting fixture, said circuit comprising: a differential transformer having a pair of windings forming the series connection with said A.C. power and having a sensing winding between said pair of windings adapted to be responsive to the difference between the loading of respective ones of said windings of said differential transformer and including means to develop a difference signal when a leakage develops in said lighting fixture connections due to moisture from said swimming pool entering said fixture; a normally non-conductive control circuit means coupled with said sensing winding and being responsive to said difference signal to become conductive; and a relay circuit having when energized normally closed connections in series with said differential transformer and said lighting fixture and completing the circuit thereto from said A.C. power source, said relay circuit being connected in said control circuit so as to be substantially short-circuited thereby when said control circuit is conductive and to be energized when said control circuit is non-conductive said relay circuit including a manually operable test switch connected in series therewith in the form of a normally closed switch by which power may be removed from said relay circuit when said switch is opened to simulate the action of said relay in the presence of said leakage due to moisture whereby when a leakage develops in said pool lighting fixture said differential transformer becomes unbalanced and said sensing means derives therefrom a difference signal which renders said control circuit conductive and thereby said relay circuit becomes de-energized and opens said normally closed connections to remove the power from said lighting fixtures to prevent electric shock hazard to persons in the pool, and whereby a leakage condition may be simulated as a test of the system.

5. A leak detecting circuit according to claim 4, wherein a transistor circuit is connected across said relay circuit in such fashion that when said relay is not energized the current through said transistor circuit corresponds to that which goes through said relay when energized whereby maintaining a constant load on the power source.

6. A leak detecting circuit according to claim 4, wherein said control circuit is one which when once rendered conducting remains conducting until power is removed therefrom, said control circuit being provided with a normally closed switch series connected therewith, said switch being adapted to remove power from said control circuit when opened, whereby said lighting fixtures may be disconnected from the power until such time as the leak is removed and power returned thereafter.

7. A leak detecting circuit comprising: a differential transformer having a pair of balanced windings wound so as to induce opposing fields and a sense winding adapted to develop therein an A.C. signal proportional to the degree of any unbalance which may develop in said balanced windings; a rectifier connected to said sense winding and responsive to said A.C. unbalance signal and being poled to develop a D.C. signal of predetermined polarity in response to signals derived from said sense winding; an unijunction transistor having normally non-conductive connections and a charge storage capacitor connected with said rectifier to accumulate a charge thereon in response to said D.C. signal to render said unijunction conducting; a normally non-conductive control circuit having a gate circuit connected to said unijunction transistor adapted to be responsive to said unijunction transistor when conductive in response to said charge accumulation on said capacitor to be gated into a conductive state; a relay having normally closed contacts when energized and being adapted to be energized when said control circuit is non-conductive; said relay being connected in parallel with said normally non-conductive control circuit and being short-circuited by said control circuit when said control circuit is conductive and being thereby de-energized; and an illuminating lamp disposed in a normally sealed enclosure in a swimming pool and having electrical connecting wires connected through said balanced windings and through said normally closed contacts of said relay to an external source of A.C. power, said lamp being energized when said relay is energized, said connecting wires being likely to be exposed to moisture from said pool in the event of a leak in said sealed enclosure, said moisture providing a leakage path from said exposed connecting wires to the swimming pool creating thereby a hazard to the safety of persons in said pool, said leakage path resulting in a difference in the loading and impedance of said balanced windings and thereby inducing an A.C. signal in said sense winding and creating a D.C. signal to charge said capacitor and render said control circuit conductive to de-energize said relay, thereby opening said normally closed contacts to remove said external A.C. power from said lamp and said differential transformer thereby eliminating the hazard until the leak can be corrected.

8. A leak detector circuit according to claim 7 wherein a normally open push button switch is connected across one of said balanced windings of said differential transformer whereby when said push-button switch is actuated and closed said one winding is shorted to unbalance said differential transformer to simulate the leakage condition and thereby to operate said circuit in a test mode as if a leakage had occurred.

9. A leak detector circuit according to claim 7, wherein a normally closed switch is connected in series with said relay circuit, whereby when said switch is opened the relay is de-energized and the leakage condition is simulated for test.

10. A leak detector circuit according to claim 7, wherein said control circuit is adapted when once rendered conducting to remain conducting until power is removed therefrom, and wherein normally closed switch is connected in series therewith, whereby power may be removed from said control circuit upon opening said switch to return said control circuit to the non-conductive condition thereof after the leak has been eliminated.

11. In an electric circuit leakage detecting means: a differential transformer having a pair of windings in phase opposition and a sense winding on a common core, said pair of windings being connected in series with the electric circuit so as to produce no induced current in said sense winding as long as there is no leakage therefrom and the currents in said pair of windings remain equal and opposite in phase normally conductive control circuit means connected with said sense winding and being adapted to become non-conductive in the presence of an induced current in said sense winding; and normally closed relay circuit means having contacts in series with said electric circuit and a coil in parallel with said control circuit means and being short circuited thereby to be de-energized when said control circuit is conductive; whereby when an induced current is developed in said sense winding said control circuit is rendered non-conductive due to a leakage developing from one of said pair of windings and said relay becomes energized to open said electric circuit and prevent the power thereof to be applied to any utilization circuit that may be connected therein.

12. A leak detecting circuit for hermetically sealed underwater swimming pool lighting fixtures and connected in series with the A.C. power connections to said lighting fixtures, said circuit comprising: a differential transformer comprising the series connection with said A.C. power and having sensing means therein for detecting the difference between the loading thereof and including means to derive a difference signal when a leakage develops in said lighting fixture connections due to moisture from said swimming pool entering said fixture; a normally conductive control circuit means coupled with said sensing means and being responsive to said difference signal to become non-conductive; and relay means having normally closed connections in series with said differential transformer and said lighting fixture and completing the circuit thereto from said A.C. power source, said relay means being connected in said control circuit so as to be substantially short circuited thereby when said control circuit is conductive and to be energized when said control circuit is non-conductive whereby when a leakage develops in said pool lighting fixture said differential transformer becomes unbalanced and said sensing means derives therefrom a difference signal which renders said control circuit non-conductive and thereby said relay becomes energized and opens said normally closed connections to remove the power from said lighting fixtures to prevent electric shock hazard to persons in the pool.

13. The leak detecting circuit defined in claim 12 wherein there is provided a momentary switch in one of said differential transformer series connections to unbalance said transformer when actuated and simulate the condition corresponding to the development of a leakage in said fixture; and a momentary reset switch connected between said sensing means and said control circuit to disconnect said sensing means from said control circuit when actuated so as to permit said control circuit to become conducting again and de-energize said relay means to restore power to said lighting fixture after a simulated test or after repair of the leakage.

14. A leak detecting circuit comprising: a differential transformer having a pair of balanced windings wound so as to induce opposing fields and a sense winding adapted to develop therein an A.C. signal proportional to the degree of any unbalance which may develop in said balanced windings; an amplifier connected to said sense winding and being adapted to amplify said A.C. unbalance signal; a rectifier connected to said amplifier and being poled to develop a D.C. signal of predetermined polarity in response to signals derived from said amplifier; a charge storage capacitor connected with said rectifier to accumulate a charge thereon in response to said D.C.

signal; a normally conductive control circuit adapted to be responsive to said charge accumulation on said capacitor in said predetermined polarity to become non-conductive; a relay having normally closed contacts when de-energized, said relay being connected in parallel with said normally conductive control circuit and being short-circuited by said control circuit when said control circuit is conductive, said relay being thereby de-energized and being adapted to become energized when said control circuit becomes non-conductive; and an illuminating lamp disposed in a normally sealed enclosure in a swimming pool and having electrical connecting wires connected through said balanced windings and through said normally closed contacts of said relay to an external source of A.C. power, said lamp being energized when said relay is deenergized, said connecting wires being likely to be exposed to moisture from said pool in the event of a leak in said sealed enclosure, said moisture providing a leakage path from said exposed connecting wires to the swimming pool creating thereby a hazard to the safety of persons in said pool, said leakage path resulting in a difference in the loading and impedance of said balanced windings and thereby inducing an A.C. signal in said sense winding and creating a D.C. signal to charge said capacitor and render said control circuit non-conductive to energize said relay opening said normally closed contacts to remove said external A.C. power from said lamp and said differential transformer thereby eliminating the hazard until the leak can be corrected.

15. The leak detector circuit defined in claim 14 wherein a normally closed push-button reset switch is included in said connection between said charge storage capacitor and said control circuit to disconnect said charge storage circuit from said control circuit when said push button switch is actuated and opened and return said control circuit to a conductive condition after said leak has been corrected.

16. The leak detector circuit defined in claim 14 wherein a normally open push button switch is connected across one of said balanced windings of said differential transformer whereby when said push-button switch is actuated and closed said one winding is shorted to unbalance said differential transformer to simulate the leakage condition and thereby to operate said circuit in a test mode as if a leakage had occurred.

References Cited

UNITED STATES PATENTS

| | | | |
|---|---|---|---|
| 3,165,671 | 1/1965 | Mintz et al. | 317—27 |
| 3,187,225 | 6/1965 | Mayer | 317—27 X |
| 3,202,875 | 8/1965 | Bateman | 317—18 |
| 3,213,321 | 10/1965 | Dalziel | 317—18 |
| 3,214,638 | 10/1965 | Moser et al. | 317—18 |
| 3,243,658 | 3/1966 | Blackburn | 317—18 X |

LEE T. HIX, *Primary Examiner.*

J. D. TRAMMELL, *Assistant Examiner.*